United States Patent [19]
Kaner et al.

[11] Patent Number: 6,120,748
[45] Date of Patent: Sep. 19, 2000

[54] PROCESS FOR RAPID SOLID-STATE FORMATION OF REFRACTORY NITRIDES

[75] Inventors: Richard B. Kaner, Santa Monica; Charles H. Wallace, Corte Madera, both of Calif.

[73] Assignee: The Regents of the University of California, Oakland, Calif.

[21] Appl. No.: 09/254,627

[22] PCT Filed: Sep. 9, 1997

[86] PCT No.: PCT/US97/15859

§ 371 Date: Jun. 18, 1999

§ 102(e) Date: Jun. 18, 1999

[87] PCT Pub. No.: WO98/11017

PCT Pub. Date: Mar. 19, 1998

Related U.S. Application Data

[60] Provisional application No. 60/025,187, Sep. 10, 1996.

[51] Int. Cl.$^7$ ......................... C01B 21/064; C01B 21/06; C01B 21/076; C01B 21/072
[52] U.S. Cl. ......................... 423/290; 423/409; 423/411; 423/412
[58] Field of Search ................................. 423/409, 411, 423/412, 290

[56] References Cited

U.S. PATENT DOCUMENTS

| | | |
|---|---|---|
| 3,701,826 | 10/1972 | De Vries et al. . |
| 4,877,759 | 10/1989 | Holt et al. . |
| 5,110,768 | 5/1992 | Kaner et al. . |

OTHER PUBLICATIONS

Rao and Kaner, "Rapid Solid-State-Precursor Synthesis of Crystalline Boron Nitride", *Inorganic Chemistry*, vol. 33, No. 25, 1994, Reprint, pp. 3210–3211. (no month).
Abstract No. 291237, Gillan et al., "Rapid Solid State Synthesis of Refractory Nitrides", XP 2051166. (no date).
Database Derwent, JP 52 021 300 A (Kuratomi T), Feb. 17, 1977, XP 2051167.
"Chemistry of Synthetic High Polymers", *Chemical Abstracts*, Dec. 12, 1994, vol. 121, No. 24, Columbus, Ohio.
Gillan and Kaner, "Synthesis of Refractory Ceramics via Rapid Metathesis Reactions between Solid-State Precursors", *Chem. Mater.*, 1996, 8, pp. 333–343. (no month).
Wiley and Kaner, "Rapid Solid-State Precursor Synthesis of Materials", *Science*, vol. 255, pp. 1093–1097, Feb. 28, 1992.
Xie et al., "A Benzene-Thermal Synthetic Route to Nanocrystalline GaN", *Science*, vol. 272, pp. 1926–1927, Jun. 28, 1996.

*Primary Examiner*—Wayne Langel
*Attorney, Agent, or Firm*—Koppel & Jacobs; Michael J. Ram

[57] ABSTRACT

A process for forming high quality crystalline refractory materials, particularly gallium (Ill) nitride (GaN), from solid precursors. By blending dry reactants in an oxygen and moisture free environment, placing the reactants in a sealed vessel, pressurizing the reactants to in excess of 5 kilobars (5000 atmospheres) and rapidly exposing the reactants to a temperature in excess of about 225° C. The soluble salt by-products are then extracted from the resultant mixture, leaving high purity crystals of the nitride in the form of a fine powder.

10 Claims, 4 Drawing Sheets

PROCESS FOR RAPID SOLID-STATE FORMATION OF REFRACTORY NITRIDES

CROSS REFERENCE TO RELATED APPLICATION

This application claims the priority of provisional U.S. Patent application Ser. No. 60/025,187, filed Sep. 10, 1996.

BACKGROUND

This invention was made in part with support from the National Science Foundation Grant Number DMR 9315914.

The present invention relates to a process for forming high quality crystalline refractory materials, particularly gallium (Ill) nitride (GaN), from solid precursors. GaN is a material newly available for use in the optoelectronics industry fur the fabrication of light-emitting diodes (LEDs) and blue lasers. It is also possible that doped GaN crystals may have utility as semiconductors. A particularly suitable application is the replacement of standard light bulbs in large outdoor displays, traffic lights and street lighting by GaN LEDs. GaN crystals, when properly activated, fluoresce producing a bright blue glow which is about 60 times brighter than the best GaP based yellow-green LEDs and many times brighter than a standard light bulb which it would replace. Further, a GaN LED display would have an operating life far in excess of the standard light bulb.

Currently, bulk quantities of high purity, polycrystalline gallium nitride are not available. Current techniques to produce such materials require maintaining reactants at high temperatures and pressures for long periods of time. Prior attempts to manufacture GaN by reacting gallium iodide with lithium nitride, which appears to be a suitable approach, produces elemental Ga, nitrogen and LiI and not GaN. Thus there is a need for a low cost, rapid process to produce large quantities of powdered crystalline materials for use in such applications as lighting, signal displays, and flat screen displays for computers and television screens.

SUMMARY

These needs are met by the present invention which comprises a low temperature process for directly forming crystals of refractory nitrides by blending dry reactants in an oxygen and moisture free environment, placing the reactants in a sealed vessel, pressurizing the reactants to in excess of 5 kilobars (5000 atmospheres) and rapidly exposing the reactants to a temperature in excess of about 225° C. The soluble salt by-products are then extracted from the resultant mixture, leaving high purity crystals of the nitride in the form of a fine powder.

The invention can be used for preparing a wide variety of refractory materials. However, it is particularly suitable for preparing gallium nitride (GaN). In a first embodiment $GaI_3$ is mixed with $Li_3N$, the mixture is placed in a pressure vessel and heated by exposure to a resistively heated wire. It was discovered that performing this reaction at pressures in excess of 5 kbar resulted in GaN instead of elemental gallium and nitrogen.

DRAWINGS

These and other features, aspects and advantages of the present invention will become better understood with reference to the following description and accompanying drawings, where:

DESCRIPTION

Figures 1, 2:
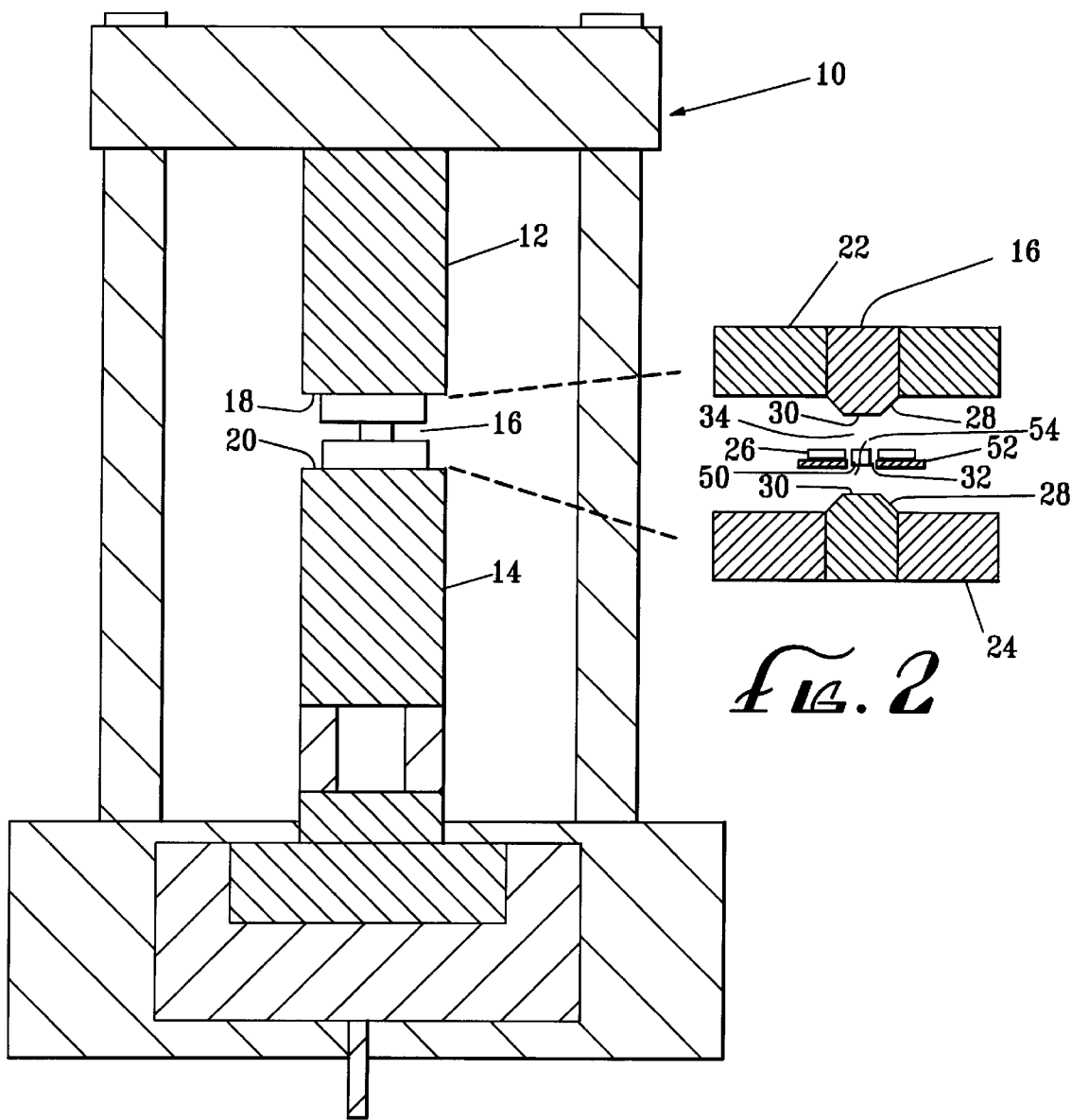
FIG. 1 is a front schematic view of an apparatus used to perform the process embodying features of the invention.
FIG. 2 is an enlarged exploded front schematic view of a first type of reaction chamber used with the apparatus of claim 1.

It has been discovered that high quality, pure, refractory crystalline materials, particularly refractory nitrides and more particularly gallium nitride, can be produced by a solid-state exchange (metathesis) reaction when conducted in a controlled environment at high pressures with initial temperatures being ambient. FIG. 1 shows an apparatus 10 used for performing this reaction. The apparatus 10 is a hydraulic press which includes an upper and lower piston 12, 14 capable of applying pressure on a reactant mixture placed within a reaction fixture 16 positioned between the juxtaposed faces 18, 20 of the upper and lower pistons 12, 14.

FIG. 2 is a first example of a reaction fixture 16 suitable for use to perform the process of the invention. The reaction fixture 16 consists of upper and lower anvils 22, 24, commonly referred to as Bridgman anvils, and washer 26 placed therebetween. The anvils 22, 24 generally include a centrally located tungsten carbide core or pin 28 of a high strength metal which, for a particular embodiment of the invention, is electrically conductive. In use, the anvils 22, 24 are arranged with an exposed end 30 of each facing each other, the washer 26 being placed with the hole 32 between and in the center of the anvil pins 28 to define a space therebetween which functions as a reaction chamber 34. The assembled reaction fixture 16, with the reactants 50 placed in the reaction chamber 34, is then placed between the pistons 12, 14 so that application of pressure to the pistons 12, 14 exerts pressure on the pins 28 and, in turn, the reactants placed within the hole 32 in the washer (ie, the reaction chamber 34).

Typical dimensions for relevant portions of the reaction fixture 16 using the Bridgman anvils 22, 24 are an anvil pin exposed end 30 of ⅜ inches diameter and an Inconel washer 26 having a thickness of 0.393 inches (1 mm), the centrally located hole 32 having a diameter of 3/16 inch (0.1875 inch).

Figure 3:
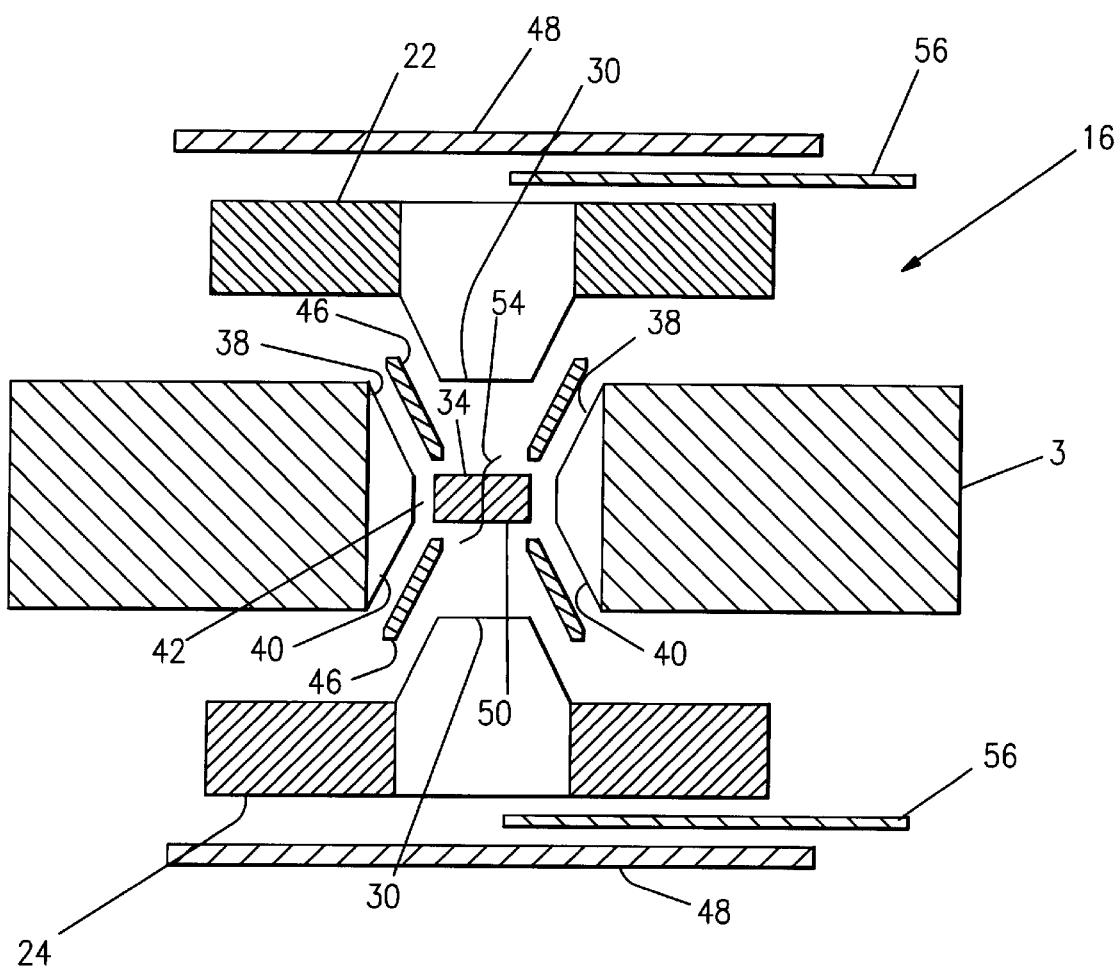
FIG. 3 is an enlarged exploded front schematic view of a second type of reaction chamber used with the apparatus of claim 1.

In a second version of the reaction fixture 16, shown in FIG. 3, the anvil exposed ends 30 have a diameter of 0.5 inch. In place of the washer 26, a thick retaining ring 36 with a central opening having upper and lower tapered surfaces 38, 40 and a circular, vertical central portion 42 of 0.560 inch in diameter is used. The upper and lower tapered surfaces 38, 40 mate with similarly tapered surfaces on the upper and lower anvils 22, 24. Prior to assembly, electrically insulating, pressure sealing tapered rings made of pyrophillite 46 are placed between the surfaces to be mated and an insulator 48 is placed between the upper and lower surface of the assembly and the pistons 12, 14 of the press 10. When the fixture is assembled a circular reaction chamber 34 of 0.560 inch in diameter and 0.150 inch thickness is created between the components.

Using prior art techniques, in which the reactants are reacted under ambient conditions for extended periods of time, $TaCl_5$ has been reacted with $Li_3N$ to produce hexagonal phase TaN with only a trace of the cubic phase.

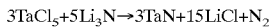

$$3TaCl_5 + 5Li_3N \rightarrow 3TaN + 15LiCl + N_2$$

Using the process and apparatus described above and operating at approximately 30 kbar or greater the same reaction produces primarily cubic phase TaN with only a trace of the hexagonal phase.

Figure 4:
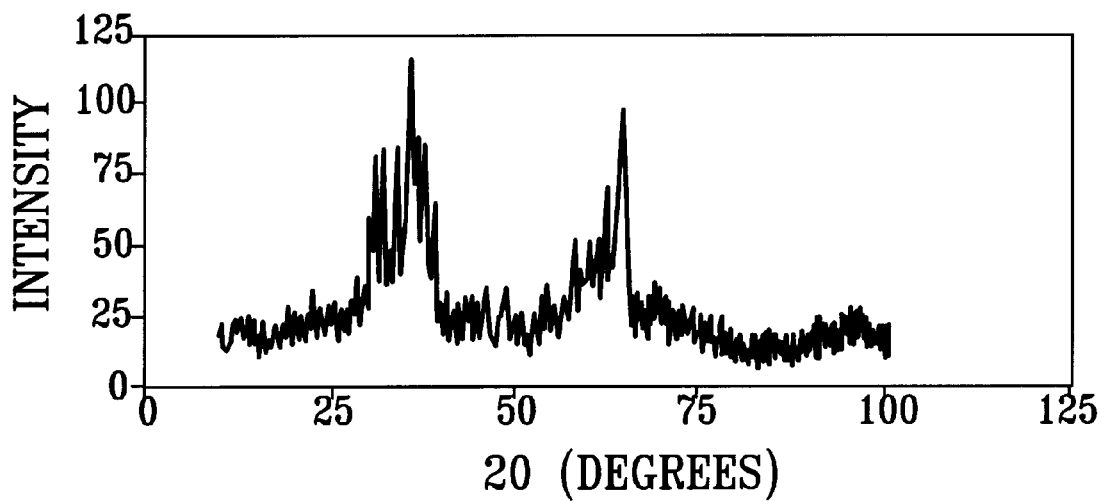
FIG. 4 is an X-ray diffraction pattern elicited from the solid products of the solid-state metathesis reaction at ambient conditions of $GaI_3$ and $Li_3N$.

It has been found that the process and apparatus described above can also be used to synthesize products which are not thermodynamically favored using the same reactants at ambient conditions. GaN can not be formed by solid-state metathesis reactions under ambient conditions. Instead, elemental Ga and nitrogen gas are produced according to the formula:

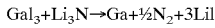

$$GaI_3 + Li_3N \rightarrow Ga + \tfrac{1}{2}N_2 + 3LiI$$

along with various soluble compounds of gallium, such as oxides. The solid reaction product of the ambient reaction, all of which are soluble in aqueous or acid solutions, has the X-ray diffraction pattern shown in FIG. 4. This is consistent with the absence of GaN in the product.

Figure 5:
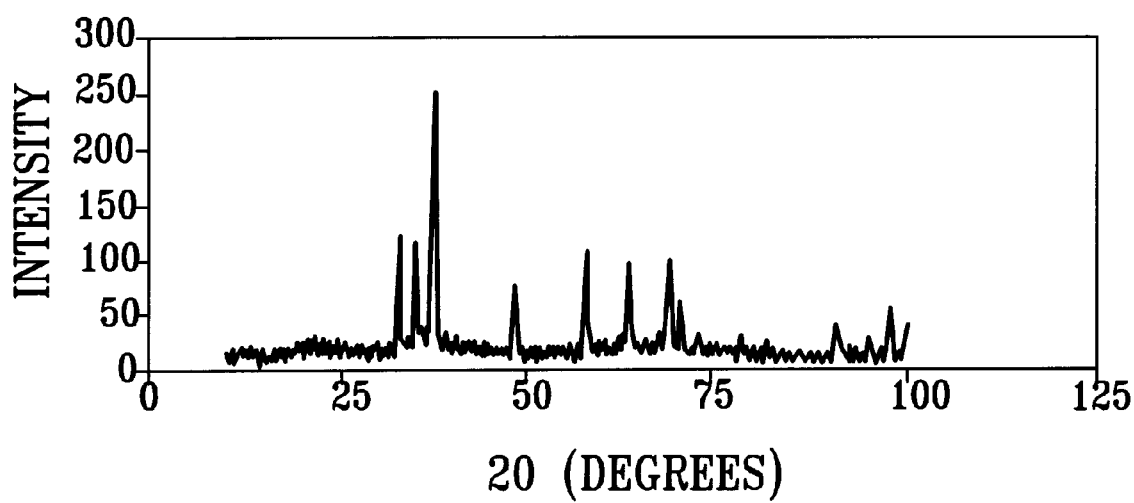
FIG. 5 is an X-ray diffraction pattern elicited from the solid products of the solid-state metathesis reaction at 45 kbar of $GaI_3$ and $Li_3N$.

It has been found that when this reaction is performed using the apparatus and process described above under high pressure conditions (25–40 kbar), GaN is preferentially produced instead of Ga and $N_2$ gas. FIG. 5 shows the X-ray diffraction pattern for the nonsoluble reaction product. This material, which has been determined to be pure crystalline GaN, fluoresces with an intense blue violet glow, the photoluminescence spectra thereof being shown in FIG. 6.

Figure 6:
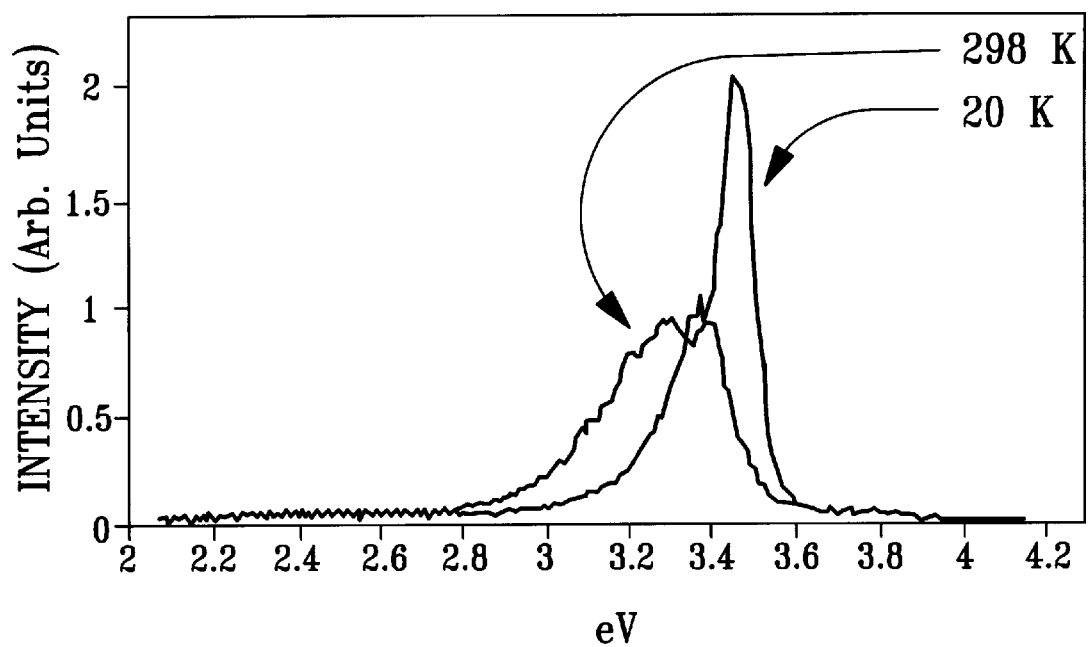
FIG. 6 shows the photoluminescence spectra at 298 K and 20 K of a GaN sample produced at 45 kbar.

The high quality of the gallium nitride produced by metathesis under 4.5 GPa confining pressure is apparent in the photoluminescence spectra shown in FIG. 6. The excitation source is 5 ns, 20 µJ pulse of 266 nm radiation. The room temperature 298 K spectrum (FIG. 6, bottom) reveals only the 3.38(3) eV band gap characteristic of bulk gallium nitride. The low temperature (20 K) spectrum (FIG. 6 upper curve) is also consistent with high quality bulk GaN with a sharp excitonic transition at 3.45(3) eV and lower energy features originating from known donor-acceptor pair recombination. The photoluminescence measurements do not show either size effects or surface states, consistent with micron-scale, rather than nano-scale, crystallites. This is confirmed by scanning electron microscopy and a negligible amount of line broadening measured in the X-ray diffraction pattern (FIG. 5) when compared to an external silicon standard.

The high pressure solid-state metathesis process incorporating features of the invention, has also been shown to produce $Si_3N_4$ according to the formula:

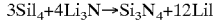

$$3SiI_4 + 4Li_3N \rightarrow Si_3N_4 + 12LiI$$

These reactants produce a totally different product under ambient conditions.

EXAMPLE 1

GaN was prepared using the apparatus shown in FIGS. 1 and 2 and described above. The Inconel washer 26 was coated with a paste 52 composed of magnesia (MgO) and alumina ($Al_2O_3$) in an epoxy binding material to electrically insulate the washer from the two anvils 22, 24. A pellet of reactants 50 was prepared by intimately mixing 0.08353 g of $GaI_3$ and 0.00646 g of $Li_3N$ in a moisture free helium atmosphere and the mixture was placed within the hole 32 in the washer 26 with a conductive fine gauge iron wire 54 vertically arranged through the center of the pellet 50 such that when placed between the anvils 22, 24 the anvils are in contact with the opposite ends of the wire 54. While maintaining the inert atmosphere around the pellet 50 the reaction fixture 16 was assembled, placed in the press 10 with the ends of the hydraulic pistons 18, 20 in the press electrically insulated from the anvils by a PVC sheet 48 (see FIG. 3), and 45,227 lbs force was applied to the ⅜ inch anvils 12, 14, resulting in approximately 28.2 kbar being applied to the pellet 50. An electrical current (0.5 to 1 amp) was then applied to the anvils via copper leads 56 (see FIG. 3), the current flowing through the iron wire 54 in the center of the pellet 50 causing the wire 54 to heat to greater than 227° C., the reaction occurring and being complete in a few seconds. The fixture was then disassembled, the powdered product washed with water and acid to remove all soluble salts produced in the reaction and the insoluble material collected, which was approximately $30\%_w$ of the reaction product, and analyzed. The X-ray diffraction pattern and photoluminescence spectra of the collected insoluble material is shown in FIGS. 5 and 6.

EXAMPLE 2

GaN was prepared using the apparatus 10 shown in FIGS. 1 and 3 and described above. The upper and lower tapered surfaces 38, 40 of the thick retaining ring 36 were electrically insulated from the twn anvils 22, 24 by tapered pyrophyllite insulating rings 46. A pellet of reactants 50 was prepared by intimately mixing 1.6059 g of $GaI_3$ and 0.1241 g of $Li_3N$ in a moisture free helium atmosphere and the mixture was placed within the central vertical portion of the ring 36 with a 1.5 cm length of a conductive fine gauge iron wire 54 vertically arranged through the center of the pellet 50 such that when placed between the anvils the anvils 22, 24 are in contact with the opposite ends of the wire 54. The pellet 50 had a volume of about 0.0369 in³. While maintaining the inert atmosphere around the pellet 50 the reaction fixture 16 was assembled, placed in the press 10 with the ends of the hydraulic pistons 18, 20 in the press electrically insulated from the anvils by a PVC sheet 48, and force was applied to the anvils 22, 24. Several different experiments were run with pressures of from 84,530 to 127,000 pounds of force applied to the ½ inch diameter anvils, creating a force on the pellet 50 of from 29.7 to 44.8 kbar. An electrical current (0.5 to 1 amp) was then applied to the anvils 22, 24, the current flowing through the iron wire 54 in the center of the pellet 50 causing the wire 54 to heat to greater than 227° C., the reaction occurring and being complete in a few seconds. The fixture was then disassembled, the powdered product washed with water and acid to remove all soluble salts produced in the reaction and the insoluble material collected, which was approximately $30\%_w$ of the reaction product, and analyzed. The X-ray diffraction pattern and photoluminescence spectra of the collected insoluble material in each experiment was substantially as shown in FIGS. 5 and 6.

To demonstrate the potential for device fabrication, pulsed laser deposition (PLD) of the resultant GaN powder was used to grow thin polycrystalline GAN films on MgO substrates. A pressed pellet of GaN powder was used as a rotating target in a vacuum chamber with a pressure $\leq 5 \times 10_{-8}$ Torr during growth. The target was preablated to remove any surface contaminants. A 50 ml pulsed Eximer laser (248 nm) with a fluence of~$211/cm^2$ at a pulse repetition rate of 1 Hz for 4 hours enable films of 800 Å thickness to be grown on a MgO substrate heated to 580° C. A bright blue photoluminescence generated is a secondary reflection from the GaN. The primary, bright reflection is a white spot. Although the high energy pulsed laser caused irreversible damage to the thin film after 1,000 laser shots, the photoluminescence spectrum (FIG. 6) reveals the signature of GaN with a good signal to noise ratio.

It is believed that the process described above can be used to produce the preferred forms of many other crystalline refractory materials such as rhombohedral or cubic BN rather than the more thermodynamically favored phases (under ambient conditions) of these materials.

Although the present invention has been described in considerable detail with reference to certain preferred versions and uses thereof, other versions and uses are possible. Therefore, the spirit and scope of the invention should not be limited to the description of the preferred versions contained herein.

What is claimed is:

1. A method of preparing inorganic nitrides comprising:
   a) forming a chamber for holding reactants therein, said chamber allowing application of a preselected high pressure to said reactants;
   b) applying the preselected high pressure to the reactants;
   c) rapidly heating the reactants, said heating causing a chemical reaction to occur and the desired inorganic nitride to be formed; and
   d) separating the desired inorganic nitride from other compounds formed in the reaction, recovering a pure crystalline nitride
   wherein the inorganic nitrides are selected from the group consisting of gallium (III) nitride, tantalum nitride and boron nitride.

2. The method of claim 1 for preparing inorganic nitrides wherein the preselected high pressure is applied by placing said chamber with reactants enclosed therein between two anvils in an hydraulic press and moving the anvils toward each other such that pressure is applied to the reactants.

3. The method of claim 2 for preparing inorganic nitrides wherein the preselected high pressure is greater than 25 kbar.

4. The method of claim 3 for preparing inorganic nitrides wherein the preselected high pressure is between 25 kba and 40 kbar.

5. The method of claim 1 for preparing inorganic nitrides wherein the means for creating the elevated temperature is an electrical current applied to electrically conductive anvils.

6. The method of claim 5 for preparing inorganic nitrides wherein the means for creating the elevated temperature is an electrical current applied to an electrically conductive wire placed within the reactants and in contact with the electrically conductive anvils.

7. The method of claim 1 for preparing inorganic nitrides wherein the elevated temperature is at least about 225° C.

8. The method of claim 1 for preparing inorganic nitrides wherein the inorganic nitride is gallium (III) nitride and the reactants are $GaI_3$ and $Li_3N$.

9. The method of claim 8 for preparing gallium (III) nitride wherein the pressure is between 25 kbar and 40 kbar and the temperature is greater than about 225° C.

10. A method of preparing gallium (III) nitride comprising:
   a) forming a cylindrical chamber and placing that cylindrical chamber on a horozontal upward facing surface of an anvil within a hydraulic press;
   b) forming an intimate mixture of stoichiometric quantities of $GaI_3$ and $Li_3N$ and filling the cylindrical chamber with that mixture
   c) operating the hydraulic press so as to move a second anvil toward the first anvil such that a pressure in excess of 25 kba is applied to said mixture by the anvils;
   d) rapidly heating the mixture to at least 225° C., said heating causing a chemical reaction to occur in the mixture to form a reaction composition, and
   e) removing and separating the desired nitride from other compounds in the reaction composition, to recover a pure gallium nitride.

* * * * *